(No Model.) 2 Sheets—Sheet 1.

G. WOOD.
BALL BEARING.

No. 586,921. Patented July 20, 1897.

WITNESSES:
William P. Goebel,
F. S. Kennedy.

INVENTOR
George Wood
BY George Cook
ATTORNEY.

(No Model.) 2 Sheets—Sheet 2.

G. WOOD.
BALL BEARING.

No. 586,921. Patented July 20, 1897.

WITNESSES:
William P. Goebel.
F. S. Kennedy,

INVENTOR
George Wood
BY George Cook
ATTORNEY.

UNITED STATES PATENT OFFICE.

GEORGE WOOD, OF NEWARK, NEW JERSEY, ASSIGNOR, BY MESNE ASSIGNMENTS, OF ONE-HALF TO ANNIE MILNE, OF SAME PLACE.

BALL-BEARING.

SPECIFICATION forming part of Letters Patent No. 586,921, dated July 20, 1897.

Application filed February 18, 1897. Serial No. 623,956. (No model.)

*To all whom it may concern:*

Be it known that I, GEORGE WOOD, a citizen of the United States, and a resident of Newark, in the county of Essex and State of New Jersey, have invented certain new and useful Improvements in Roller-Bearings, of which the following is a specification.

My invention relates to an improvement in roller-bearings which, while adapted for use in wagon-wheels, shafting, &c., has been more especially devised for use in bicycles, tricycles, and like vehicles, the object being to so construct and arrange the several parts that the bearing may be adjusted without the necessity of loosening the nuts holding the wheel in its proper position in the forks.

With this and other ends in view my invention consists in certain novel features of construction and combinations of parts, as will be hereinafter fully described, and pointed out in the claims.

Figure 1:
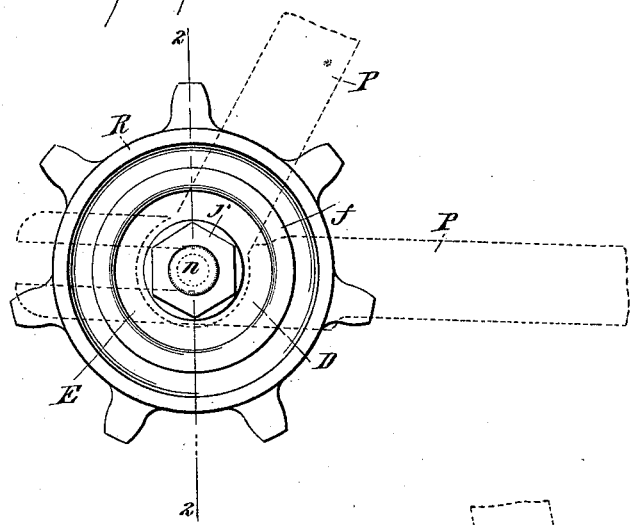
Figure 2:
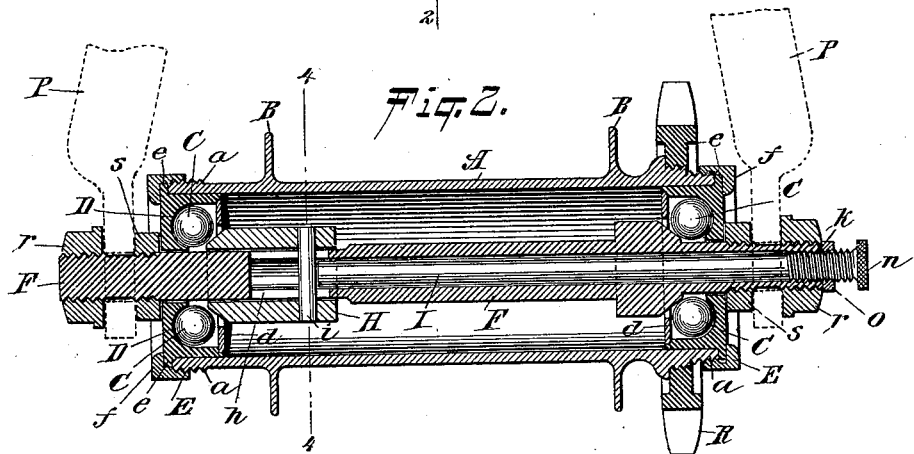
Figure 3:
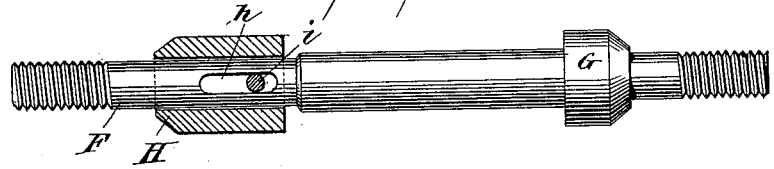
Figure 4:
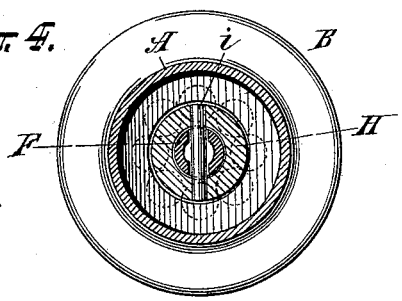
Figure 5:
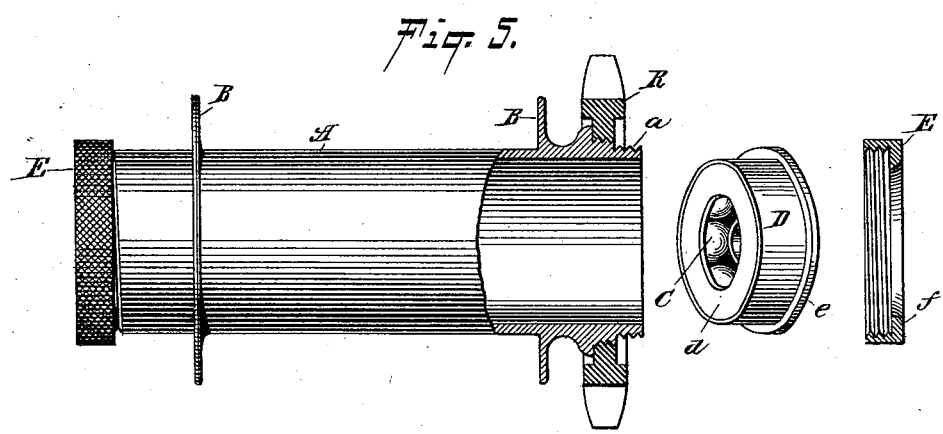
Figure 6:
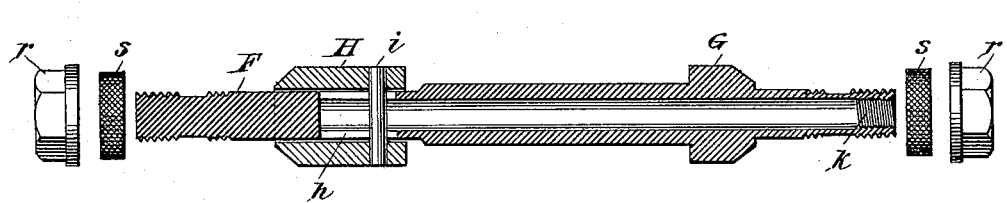
Figure 7:
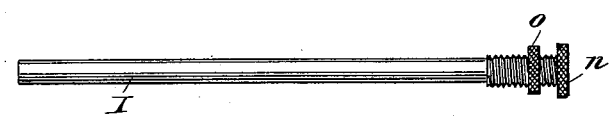

In the accompanying drawings, Figure 1 is a side view of a hub of a bicycle containing my improved bearing. Fig. 2 is a sectional view taken on the line 2 2 of Fig. 1. Fig. 3 is a view, partly in elevation and partly in section, of the detached axle. Fig. 4 is a sectional view taken on the line 4 4 of Fig. 2. Fig. 5 is a view, partly in section and partly in elevation, of the hub and several detached parts. Fig. 6 is a sectional view of the detached axle, the adjusting-rod being omitted. Fig. 7 is a view of the adjusting-rod, and Fig. 8 a view of a modification thereof.

It will be seen by referring to the drawings that I have illustrated a ball-bearing, A representing a barrel-hub, preferably made of metal and provided with the flanges B for the attachment of the spokes, (not shown,) the extreme ends of the barrel being threaded, as shown at *a*.

Within the ends of the barrel are removably fitted cups or receptacles for containing the balls C, each receptacle consisting of the cup D for holding the balls, and a disk *d*, snugly fitting within the outer edge of said cup, for preventing the balls from accidentally dropping out of said cup when the latter is removed from the barrel.

On the outer face or side of each of the cups D is formed a flange *e* of the same diameter as the barrel A and fits against the extreme end of the latter when the cup is inserted in place, the outer edge of the flange being flush with the outer surface of said barrel. In order to hold said cups in their proper places within the ends of the barrel, I provide rings E, internally threaded to engage with the threads *a* on the barrel, said rings fitting over the flange *e* on the cups and provided with a flange which when the rings are screwed home fits against the outer face or side of the cup and holds the latter tightly in place.

Passing through the barrel A is the axle F, having formed thereon or secured thereto near one end a cone G, extending through an opening in the disk *d* and bearing against the balls C in the cup D, and having near its opposite end the cone H, adapted to move longitudinally thereon.

As will be seen by reference to Fig. 3, the axle F is provided with an elongated slot *h*, into which projects a pin or lug *i*, secured to the movable cone, said pin, if desired, and as shown in the drawings, extending entirely through said slot and having both ends fitted in said cone, this construction and arrangement of the parts allowing the latter to be moved longitudinally on the axle and at the same time preventing it from turning thereon.

Figure 8:

As shown by the drawings, the axle for the greater part of its length is made hollow and internally threaded, as at *k*, near one end, and has fitted therein the rod I, also threaded at one end to engage with the internal thread of the axle, the inner end of said rod I bearing against the pin or lug *i* and the outer end extending out beyond said axle and provided with a slot *m* for a screw-driver, as shown in Fig. 8, or, as shown in Figs. 2 and 7, with a knurled head *n*.

From the above it will be understood that when the rod I is turned in the proper direction by means of the knurled head or by a screw-driver applied thereto it will travel inwardly and, bearing on the pin or lug *i*, will force the cone H against the balls C in the cup D at that respective end of the barrel and at the same time force the axle in the opposite direction, thereby tightening the cone G against the balls C at that respective end of the device. After properly adjusting the device the rod I is locked in position by means of the lock-nut O, threaded on the projecting end of said rod and bearing against the end of the axle.

In Figs. 1 and 2 I have shown in dotted lines the ends P of the fork through which the axle F passes and to which it is secured by nuts r, threaded on said axle, adjusting-nuts s being also threaded on said axle between the cups D and the inner sides of the fork, the purpose and function of said nuts s being to properly center the wheel in the fork and assist the nuts r in holding it in its proper place.

When desired to adjust the bearing, the lock-nut O is turned slightly away from the end of the axle, thereby leaving the rod I free to be turned in either direction and the bearings adjusted as before described, and this without the necessity of loosening the nuts r, as has generally been the case, and also while the wheel is turning, if desired.

While I have shown my improved bearing applied to the rear hub of a bicycle, R representing the sprocket-wheel, I do not intend to limit it to such application, as it is equally well adapted for use on the crank-hanger, front hub, pedals, and, in fact, in all instances where roller-bearings may be applied.

Having fully described my invention, what I claim as new, and desire to secure by Letters Patent, is—

1. The combination with a hub, of a roller-bearing at each end, one member of one of which bearings is movable, an axle passing through said hub, and a rod fitted in said axle for adjusting said movable member, substantially as described.

2. The combination with a hub, of a roller-bearing at each end, one member of which is movable and provided with a pin or lug, an axle passing through said hub and bearings and provided with a slot into which said pin projects, and a rod fitted in said axle and bearing against said pin for adjusting said movable member, substantially as described.

3. The combination with a hub, of a set of balls in each end thereof, a cup at each end, a slotted and hollow axle passing through said hub, cones on said axle, one of which is movable, and provided with a pin or lug extending into the slot therein, said cones bearing against said balls, and a rod threaded into said hollow axle, one end of which bears against said lug for moving the cone, and the other end projecting out beyond said axle, substantially as described.

4. The combination with a hub A, of cups fitted in the ends thereof, a set of balls contained in said cups, a hollow axle passing through said hub and provided with a slot h, a cone G secured to said axle and bearing against one of said sets of balls, a cone H, movable on said axle, a pin or lug i, secured to said cone H, and projecting through said slot, a rod I threaded into said hollow axle, having one end bearing against said lug and its opposite end projecting out beyond said axle, and a lock-nut O, threaded on said rod, and fitting against the end of said axle, substantially as described.

Signed at New York, in the county of New York and State of New York, this 16th day of February, A. D. 1897.

GEORGE WOOD.

Witnesses:
F. S. KENNEDY,
GEORGE COOK.